INVENTOR
KENNETH ERIC LATIMER
BY Fred M. Vogel
AGENT

INVENTOR
KENNETH ERIC LATIMER
BY Fred M. Vogel
AGENT

Patented Aug. 5, 1952 2,606,252

UNITED STATES PATENT OFFICE 2,606,252

LOUD-SPEAKING TELEPHONE ARRANGEMENT

Kenneth Eric Latimer, London, England, assignor to Hartford National Bank and Trust Company, Hartford, Conn., as trustee Application August 8, 1947, Serial No. 767,547
In Great Britain March 29, 1945

Section 1, Public Law 690, August 8, 1946
Patent expires March 29, 1965

5 Claims. (Cl. 179—1)

This invention relates to loud-speaking telephone arrangements of the kind in which the loud-speaker also serves as microphone.

According to the invention a system of this kind exhibiting stability and freedom from acoustic feedback can be constructed in the following manner: Two loud-speakers are employed in each set which loud-speakers are associated electrically with a transformer coil or equivalent structure having the properties of a Wheatstone bridge, so that the impedance of one speaker forms a balancing network for the impedance of the other. The transformer coil is so arranged possibly in association with an amplifier, that currents received from the exchange line are fed effectively to both loud-speakers in phase, whereas if the loud-speakers pick up a sound when functioning as microphones, this sound, if desired amplified possibly by a second amplifier is sent to the exchange line. It will be found that when the loud-speakers are functioning as microphones they will be effectively in phase-opposition, so that poor quality will result if the speaker talks directly along the axis of symmetry between them.

In order to get over the difficulty of the poor quality mentioned above, it is proposed, in accordance with a further feature of the invention, to interchange the connections to the loud-speakers in accordance with the requirements of the conversations so that they are effectively in phase for the direction of communication in use for the moment, but are in phase-opposition for the opposite direction, for which the quality is unimportant. The opposite direction is merely used so that the speaker can tell if the other party is trying to interrupt. According to one embodiment, automatically controlled switching means are provided so that as soon as the circuit detects that the loud-speakers are being used as microphones the connections are interchanged in such a way that the loud-speakers function as microphones in phase but as loud-speakers in phase opposition possibly with partial or complete echo suppression.

If the distant subscriber attempts to break in, the speaker will hear this attempt as soon as the echo suppressor releases, or even before this if the suppression is not complete, and will stop speaking, whereupon the circuit will revert to its alternative condition of in phase connection for the loud-speakers used as such, and in phase opposition if used as microphones.

From this it will be seen that the particular connection of the loud-speakers which gives good quality, i. e. in phase, is used in the direction in which it will be most effective, whether this be transmission or reception, and that the poor quality condition is used only to detect a change in the direction of communication.

In order that the invention may be more readily understood and carried into effect, reference will now be made to the accompanying drawings, in which—

Figure 1:
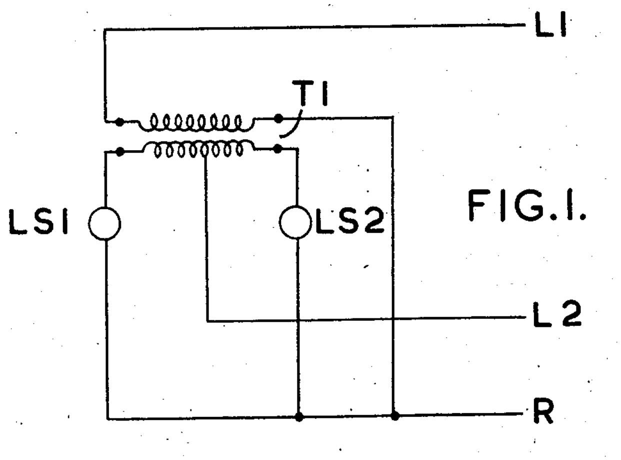
Figure 1 shows a single intercommunication desk set arrangement of two loud-speakers in conjunction with a transformer coil arrangement, adapted to give directional discrimination according to the invention.

Referring to Figure 1, $LS_1$ and $LS_2$ represent the two loud-speakers. The transformer $T_1$ should preferably have a turns ratio of $1:\sqrt{2}$, in accordance with the principles well known to those skilled in the art so that if Z is the impedance of $LS_1$ and $LS_2$ considered separately, then the impedance presented by the wires $L_1$ and $L_2$ is in each case Z/2. For currents transmitted over the circuit $L_1$ the loud-speakers will move in phase opposition, whereas in the case of $L_2$ they will move in phase. The wire R is the common return for $L_1$ and $L_2$.

Figure 2:
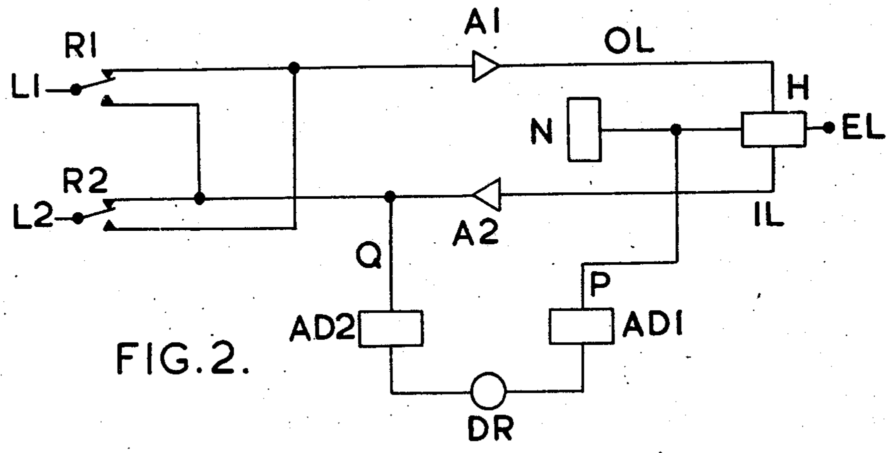
Figure 2 illustrates the relay arrangement necessary to switch the loud-speakers to the respective amplifiers in the correct order, and shows the general lay-out of the circuit.

Referring now to Figure 2, the wires $L_1$ and $L_2$ are assumed connected to the correspondingly labelled wires in Figure 1. The output of amplifier $A_1$ and the input of amplifier $A_2$ are joined to the outgoing line OL and the incoming line IL respectively and the input of $A_1$ and the output of $A_2$ are joined to the lines $L_1$ and $L_2$ through the relay contacts $R_1$ and $R_2$.

The operation of these relay contacts $R_1$ and $R_2$ must be such as to give the following switching operations in rotation. Starting from the condition in which the circuit is shown and in which it is adapted to receive speech currents with good quality from the exchange and to transmit on both loud-speakers in parallel, let it be supposed that the user of the desk set now wishes to make some remark. At first his speech will be transmitted with poor quality over $L_1$, $A_1$, and OL. The reason the speech is transmitted with poor quality at this point is that the currents generated in loudspeakers $LS_1$ and $LS_2$ and flowing through the respective halves of the primary of transformer $T_1$, induce voltages in opposing directions in the secondary, which voltages tend to cancel each other. However, as the mouth of the person who is speaking will, in practice, never be located at completely equal distances from both loudspeakers $LS_1$ and $LS_2$, complete cancellation does not occur, the voltages generated by the loudspeakers always differing somewhat in amplitude and form due to the asymmetrical position of the mouth relative to the loudspeakers. Then by differential voice-controlled circuits well known in the art, relay contacts $R_2$ are first operated, disconnecting momentarily the amplifier $A_2$ from the line $L_2$ and connecting circuits $L_1$ and $L_2$ in parallel to the input of amplifier $A_1$. Relay $R_1$, which is more sluggish than $R_2$ now also operates disconnecting $L_1$ from $A_1$ and connecting it instead to $A_2$. The circuit is now arranged to provide good quality for $L_2$—OL in which both loud-speakers are being used as microphones, whereas a poor quality path exists from IL to $L_1$ in order that the user of the desk set may be aware of incoming interruptions.

When such an interruption occurs, it will at first be heard with poor quality, and then the relays will be restored to the position shown, $R_2$ again operating quickly and $R_1$ slowly. This will have the effect of disconnecting first the amplifier $A_1$ and connecting the output of amplifier $A_2$ to circuits $L_1$ and $L_2$ in parallel. A moment later $R_1$ will also switch to its original contact thus restoring the condition in which the input line IL is connected via $L_2$ to both loud-speakers in parallel, giving good quality; circuit $L_1$ through amplifier $A_1$ to circuit OL is provided for the user of the desk set, whereby he can make a momentary interruption with rather poor quality.

Figure 2 also shows a hybrid coil H equipped with a network N suitable for balancing the exchange line, this device, whose purpose is to give greater stability, being well known in the art. In order to determine in which position relays $R_1$ and $R_2$ should be, two circuits P and Q are bridged across the network circuit N and across the output of amplifier $A_2$ respectively. These circuits are joined to the input of amplifier detectors $AD_1$ and $AD_2$ which operate differentially upon a directional relay DR whose contact controls by means not shown the position of relays $R_1$ and $R_2$. In principle, when speech is received from the exchange line EL over hybrid coil H through amplifier $A_2$, the output of amplifier detector $AD_2$ exceeds that of $AD_1$, resulting in relays $R_1$ and $R_2$ taking up the positions shown on the diagram. When, however, the user of the desk set makes a remark the output of amplifier $a_1$ will appear across the network terminals N and thus be impressed upon the input of amplifier detector $AD_1$ through circuit P. In these circumstances $AD_1$ will overcome $AD_2$ and relays $R_1$ and $R_2$ will take up the positions opposite to those shown, and in the time sequence indicated above.

If the device DR is not a polarised relay so constructed that its armature will remain in the position in which it was last placed, then some form of relay circuit must be interposed between DR and the operating coils of $R_1$ and $R_2$, so that at least the latter relays remain in the position in which they were last placed by DR. The purpose of these requirements is to prevent speech from being unduly multilated by rapid movements of the armature of DR which are liable to occur inherently due to the syllabic nature of speech. It is not necessary that the relay system should be instantly responsive as the circuit is never entirely out of service in either direction (except that the channel, which is not of immediate interest is interrupted during the switching operation, which need only occupy a few milliseconds).

Figure 3:
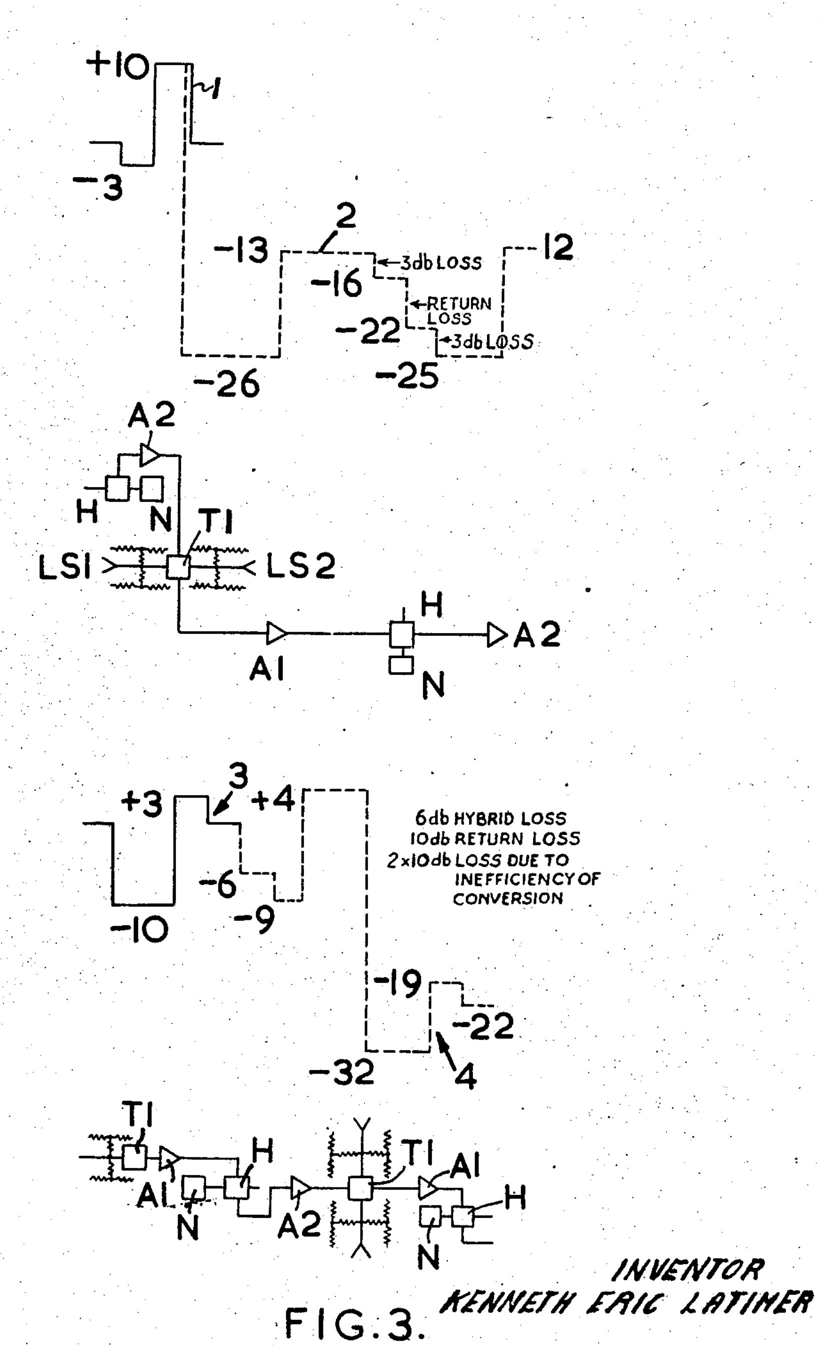
Figure 3 shows a typical transmission level diagram to illustrate one of the advantages of the invention.

It will now be explained how the sensitivity of the amplifier detector $AD_1$ and $AD_2$ should be controlled, and why the arrangement of the loudspeakers shown in Figure 1 and which is an essential feature of the invention, give rise to a further margin of stability above that which is commonly considered to be the inherent property of circuits equipped with hybrid coils. Figure 3 shows the level diagram for the complete circuit. The part of the diagram indicated by the numeral 1 shows the relative transmission levels for the condition in which speech is received from the exchange line and delivered to the desk set. The incoming level is assumed in accordance with usual practice as zero. There is a 3 db loss in the hybrid coil H and a gain assumed to be 13 db in the amplifier $A_2$. If the transformer $T_1$, which is also a hybrid coil, were equipped with a passive electrical network on one side there would be a loss of 3 db to its line terminals, but in view of the fact that the power which issues from both the line terminals is useful power, there is no such loss in this case. Before the power from the transformer $T_1$ is finally converted into sound, one must take into account the efficiency of conversion inherent in the loudspeaker. Let it be assumed for the sake of argument that this efficiency corresponds to a loss of 10 db. The power which is finally converted into sound is thus also at zero level. Let it now be assumed that the electrical circuits of the two loud-speakers are very closely matched, but that the acoustic loads differ by an amount corresponding to a return loss of 10 db. As is well known the return loss is defined by the Equation $$L = 20 \log_{10} \frac{(Z_1+Z_2)}{(Z_1-Z_2)}$$

where $Z_1$ and $Z_2$ are the electrical impedances which represent the mechanical loads. In this case the loss from the output of amplifier $A_2$ through the transformer $T_1$ to the input of amplifier $A_1$ will be as follows:

| | Decibels |
|---|---|
| Loss through hybrid coil in accordance with well known theory | 6 |
| 2 conversion losses each of 10 db | 20 |
| Return loss as above | 10 |
| Total | 36 |

Referring to the line numbered 2 in Figure 3, the input to amplifier $A_1$ for echo currents is thus at −26 db (the input to $T_1$ being at +10 db). Let it be assumed that there is a 13 db gain in amplifier $A_1$ in which case the level at the output of $A_1$ will be −13 db and the echo will thus return to the exchange line at a level of −16 db.

The balance provided by the hybrid coil will commonly be equivalent to 6 db return loss, so that the circulating current will thus be 22 db lower in level than the original speech, a condition which will provide quite good quality without an undesirable amount of distortion due to circulating currents.

Considering now the reverse direction as indicated by the line designated 3, the speech enters the two loud-speakers in phase at zero level, and suffers a 10 db loss due to efficiency in conversion. If the loud-speakers are operating in phase the whole of this power will enter the amplifier $A_1$ which has 13 db gain, thus giving an output level of +3 db. There will be 3 db loss in the hybrid coil thus giving zero level into the exchange line. Echo current is indicated by the line 4 in the diagram. There is a 6 db return loss so that the current would finally reach the input of amplifier $A_2$ at −9 db. Amplifier $A_2$ would give 13 db gain resulting in +4 db at its output. The total loss through the transformer $T_1$ has already been detailed above as 36 db so that the input to amplifier $A_1$ for the circulating current is thus at −32 db as compared with −10 db for the original speech. Here also, the circulating current is 22 db down on the direct speech.

According to the ordinary rules for assessing a circuit of this type, one would expect the circulating current to be less than the original speech by the sum of the two return losses plus the sum of the two overall losses (which in the example have both been taken as zero). The return losses being 6 db and 10 db respectively, it follows that a further 6 db in stability has been gained by switching the loud-speakers.

We now consider the relative sensitivity of the amplifier detectors $AD_1$ and $AD_2$. When speech is from the exchange line towards the desk set the level of the output of the amplifier $A_2$ (see curve 1) is +10 db, whereas the echo will appear across the network N at −16 db (see curve 2). On the other hand, for speech originating from the desk set, the level at the network N will be zero (see curve 3), whereas that at the output of amplifier $A_2$ is at +4 db (see curve 4). Thus, it is necessary for the sensitivity of $AD_1$ to exceed that of $AD_2$ by 15 db. In these conditions when the speech is received from the exchange line and transmitted towards the desk set, the output of $AD_2$ will exceed that of $AD_1$ by 11 db, whereas when speech is from the desk set towards the exchange line, that of $AD_1$ will exceed that of $AD_2$ also by 11 db. A discrimination of 11 db between the two directions of transmission should be very adequate to ensure correct operation.

Figure 4:
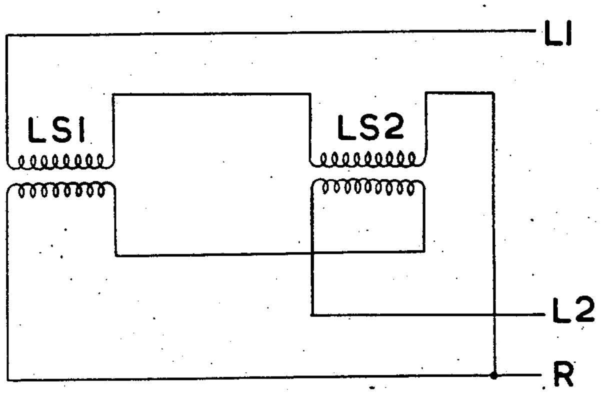
Figure 4 shows an alternative arrangement to Figure 1 using doubly wound loud-speakers.

It would be possible to eliminate the transformer $T_1$ by using loud-speakers with double windings as shown in Figure 4. Each moving coil would carry two windings, connected up in a manner analogous to a well-known form of hybrid coil. In the embodiment shown the two loud-speakers are electrically in series in respect of circuits $L_1$ and $L_2$, but the whole arrangement is equivalent to that shown in Figure 1 in that the diaphragm moves in phase for currents in one circuit and in phase opposition for currents in the other.

The present invention is particularly well adapted for use in so-called loud-speaking desk sets, the two loud-speakers being arranged side by side. It also lends itself to the apparatus known as a "telephone and trunk panel" in repeater stations, etc., these panels being provided for intercommunication and for monitoring upon the lines. In this respect the loud-speaking telephone arrangement according to the invention enables the repeater station attendant to be relieved of the encumbrance of a breast-type microphone or the handicap of a micro-telephone which has to be held in the hand.

Small moving coil loud-speakers having cones of 3" diameter are suitable for use in loud-speaking telephone arrangements according to the invention.

I claim:

1. A telephone circuit comprising a transformer having a primary winding and a pair of series-connected secondary windings, a pair of electromagnetic sound translating devices for both transmitting and receiving sound signals, said devices being serially connected across the series-connected secondary windings, the junction of said serially connected devices being connected to one end of said primary winding, a first pair of terminals connected between the junction of said serially connected devices and the other end of said primary winding, and a second pair of terminals connected between the junction of said serially connected devices and the junction of said series-connected secondary windings, whereby for signals transmitted via said first pair of terminals said devices act in phase opposition whereas for signals transmitted via said second pair of terminals said devices act in phase coincidence.

2. A telephone circuit comprising a transformer having a primary winding and a pair of series connected secondary windings, a pair of electromagnetic sound translating devices for both transmitting and receiving sound signals, said devices being serially connected across the series-connected secondary windings, the junction of said serially connected devices being connected to one end of said primary winding, a first pair of terminals connected between the junction of said serially connected devices and the other end of said primary winding, a second pair of terminals connected between the junction of said serially connected devices and the junction of said series-connected secondary windings, whereby for signals transmitted via said first pair of terminals said devices act in phase opposition whereas for signals transmitted over said second pair of terminals said devices act in phase coincidence, an incoming signal line, an outgoing signal line, first switching means arranged in one position to couple said first pair of terminals to said outgoing line and in another position to said incoming line, and second switching means arranged in one position to couple said second pair of terminals to said incoming line and in another position to said outgoing line.

3. A telephone circuit comprising a transformer having a primary winding and a pair of series-connected secondary windings, a pair of electromagnetic sound translating devices for both transmitting and receiving sound signals, said devices being serially connected across the series-connected secondary windings, the junction of said serially connected devices being connected to one end of said primary winding, a first pair of terminals connected between the junction of said serially connected devices and the other end of said primary winding, a second pair of terminals connected between the junction of said serially connected devices and the junction of said series-connected secondary windings, whereby for signals transmitted via said first pair of terminals said devices act in phrase opposition whereas for signals transmitted via said second pair of terminals said devices act in phase coincidence, an incoming signal line, an outgoing signal line, first switching means arranged in a first position to couple said first pair of terminals to said outgoing line and in a second position to said incoming line, second switching means arranged in a first position to couple said second pair of terminals to said incoming line and in a second position to said outgoing line, a directional relay mechanically coupled to said first and second switching means for actuating same and responsive to the existence of signals both in said incoming and said outgoing lines, means whereby said relay is caused to shift said first and second switching means to the first positions thereof in response to a signal in said incoming line and to shift said first and second switching means to the second positions thereof in response to a signal in said outgoing line.

4. An arrangement as set forth in claim 3 wherein said first switch had an actuation period from the one position to the other position exceeding that of said second switch.

5. A telephone circuit comprising a transformer having a primary winding and a pair of series-connected secondary windings, a pair of electromagnetic sound translating devices for both transmitting and receiving sound signals, said devices being serially connected across the series-connected secondary windings, the junction of said serially connected devices being connected to one end of said primary winding, a first pair of terminals connected between the junction of said serially connected devices and the other end of said primary winding, a second pair of terminals connected between the junction of said serially connected devices and the junction of said series-connected secondary windings, an incoming signal line, an outgoing signal line, an exchange line, a hybrid coil coupling said incoming and outgoing lines to said exchange line, a balancing network connected to said hybrid coil to balance said exchange line, a first switch arranged in a first position to couple said first pair of terminals to said outgoing line and in a second position to said incoming line, a second switch arranged in a first position to couple said second pair of terminals to said incoming line and in a second position to said outgoing line, a directional relay mechanically coupled to said first and second switches for actuating same, a first detector coupled between said incoming line and said relay for producing a control voltage in a polarity energizing said relay to actuate said first and second switches to the first positions thereof, and a second detector coupled between said balancing network and said relay for producing a control voltage in a polarity energizing said relay to actuate said switches to the second positions thereof.

KENNETH ERIC LATIMER.

REFERENCES CITED

The following references are of record in the file of this patent:

UNITED STATES PATENTS

| Number | Name | Date |
|---|---|---|
| 2,199,220 | French | Apr. 30, 1940 |
| 2,205,142 | Hoard | June 18, 1940 |
| 2,224,698 | Roseby | Dec. 10, 1940 |
| 2,264,311 | Henrick | Dec. 2, 1941 |
| 2,345,046 | Henrick | Mar. 28, 1944 |

FOREIGN PATENTS

| Number | Country | Date |
|---|---|---|
| 597,170 | Great Britain | May 5, 1948 |